United States Patent [19]
Francois et al.

[11] Patent Number: 5,738,301
[45] Date of Patent: Apr. 14, 1998

[54] ROTARY-WING AIRCRAFT OF THE COMPOUND TYPE, AND REAR STRUCTURAL ELEMENT FOR SUCH AN AIRCRAFT

[75] Inventors: Daniel Claude Francois, Cornillon; Marc Jean-Luc Rieugnie, Marignane, both of France

[73] Assignee: Eurocopter France, Marignane Cedex, France

[21] Appl. No.: 678,750

[22] Filed: Jul. 17, 1996

[30] Foreign Application Priority Data

Jul. 21, 1995 [FR] France ................................ 95 08854

[51] Int. Cl.⁶ ........................................... B64C 27/82
[52] U.S. Cl. ..................... 244/17.19; 244/51; 244/87
[58] Field of Search ......................... 244/17.11, 17.19, 244/17.21, 51, 52, 65, 13, 87

[56] References Cited

U.S. PATENT DOCUMENTS

| 3,241,791 | 3/1966 | Piasecki . |
| 3,506,219 | 4/1970 | Mouille et al. ................. 244/17.21 |
| 3,540,680 | 11/1970 | Peterson . |
| 5,102,067 | 4/1992 | Weiner et al. . |

FOREIGN PATENT DOCUMENTS

| 1511006 | 12/1966 | France . |
| 473377 | 3/1929 | Germany ........................... 244/65 |
| 4237182 | 9/1992 | Germany ........................... 244/65 |

OTHER PUBLICATIONS

Hovey, "Ducted fans for light aircraft", Feb. 1977.

*Primary Examiner*—Galen Barefoot
*Attorney, Agent, or Firm*—Fisher, Christen & Sabol

[57] ABSTRACT

The present invention relates to a rotary-wing aircraft, especially such as a helicopter, of the compound type including:
- a fuselage (2),
- fixed-wing elements (6) arranged on either side of said fuselage (2),
- at least one main rotor (4),
- an anti-torque rear rotor (9), and
- a rear thruster propeller (14), arranged at the end of the tail boom (8) of said fuselage (2).

According to the invention, said rear thruster propeller (14) has a shroud (15).

13 Claims, 2 Drawing Sheets

ROTARY-WING AIRCRAFT OF THE COMPOUND TYPE, AND REAR STRUCTURAL ELEMENT FOR SUCH AN AIRCRAFT

The present invention relates to a rotary-wing aircraft, especially such as a helicopter of the compound type, as well as to a rear structural element for such an aircraft.

A compound rotary-wing aircraft is a machine which takes off with the aid of a main rotor, like a conventional helicopter, but which, in forward flight, uses supplementary lift and propulsion means, other than the main rotor, in order to exceed the speed limits otherwise imposed by the usual rotors. Thus, a compound rotary-wing aircraft can have fixed-wing elements to increase its lift at high speed, jet engines or a propeller to supply thrust. Many projects in this direction have been designed, none of which, however, is entirely satisfactory, for a multiplicity of reasons which it is superfluous to go into in detail here.

The subject of the present invention, in this context, is a compound rotary-wing aircraft, as well as a rear structural element for such an aircraft, which are able to operate under satisfactory conditions of flight and of safety.

To this end, the rotary-wing aircraft, especially such as a helicopter, of the compound type including:

a fuselage, fixed-wing elements arranged on either side of said fuselage, at least one main rotor, an anti-torque rear rotor, and a rear thruster propeller, arranged at the end of the tail boom of said fuselage, is noteworthy, according to the invention, in that said rear thruster propeller has a shroud.

Hence, the shroud around the rear thruster propeller constitutes protection capable, on the one hand, of avoiding accidents involving personnel on the ground. In this respect, it should be noted that fatal accidents of this type occur several times every year among the global helicopter fleet with the conventional rear rotor, of smaller dimensions (diameter) than a thruster propeller. Moreover, the shroud protects the propeller from contact with the nearby environment (trees particularly) which can occur during hovering flight in overgrown areas. This shroud thus allows practical use of a rear thruster propeller, additionally constituting, in itself, an auxiliary means of thrust which is perfectly suitable in terms of speed and of acceleration.

In the case in which, particularly for similar reasons of safety and in a known way, the anti-torque rear rotor has a shroud, the shroud of said anti-torque rotor and the shroud of said thruster propeller advantageously form a structural whole, providing the coherence and the cohesion of the two shrouds.

Preferably, in this latter case, the shroud of the anti-torque rotor and the shroud of the thruster propeller are linked by a vertical empennage, fitted with a rudder flap, and a horizontal empennage can then be provided at the free upper end of the vertical empennage.

Moreover, the shroud of the anti-torque rotor, the vertical empennage and the shroud of the thruster propeller may constitute a one-piece structural assembly.

Moreover, the shroud of the anti-torque rotor and the shroud of the thruster propeller are linked by support arms and/or a lower vertical plane.

Moreover, a common driveshaft, linked to the main gearbox, and from which the anti-torque rotor can be decoupled at high speed, can be provided for the anti-torque rotor and the thruster propeller.

The invention also relates to a rear structural assembly for a rotary-wing aircraft, especially such as a helicopter, of the compound type including:

a fuselage, fixed-wing elements arranged on either side of said fuselage, at least one main rotor, an anti-torque rear rotor having a shroud, and a rear thruster propeller, arranged at the end of the tail boom of said fuselage, noteworthy, according to the invention, in that said rear thruster propeller has a shroud, and wherein said structural assembly consists of the assembly formed by the shroud of said anti-torque rotor and by the shroud of said thruster propeller.

Thus, the advantages of the two shrouds, relating mainly to flight and ground safety, are combined in a positive way, as was seen above.

The figures of the attached drawing will give a good understanding of how the invention can be produced.

Figure 1:
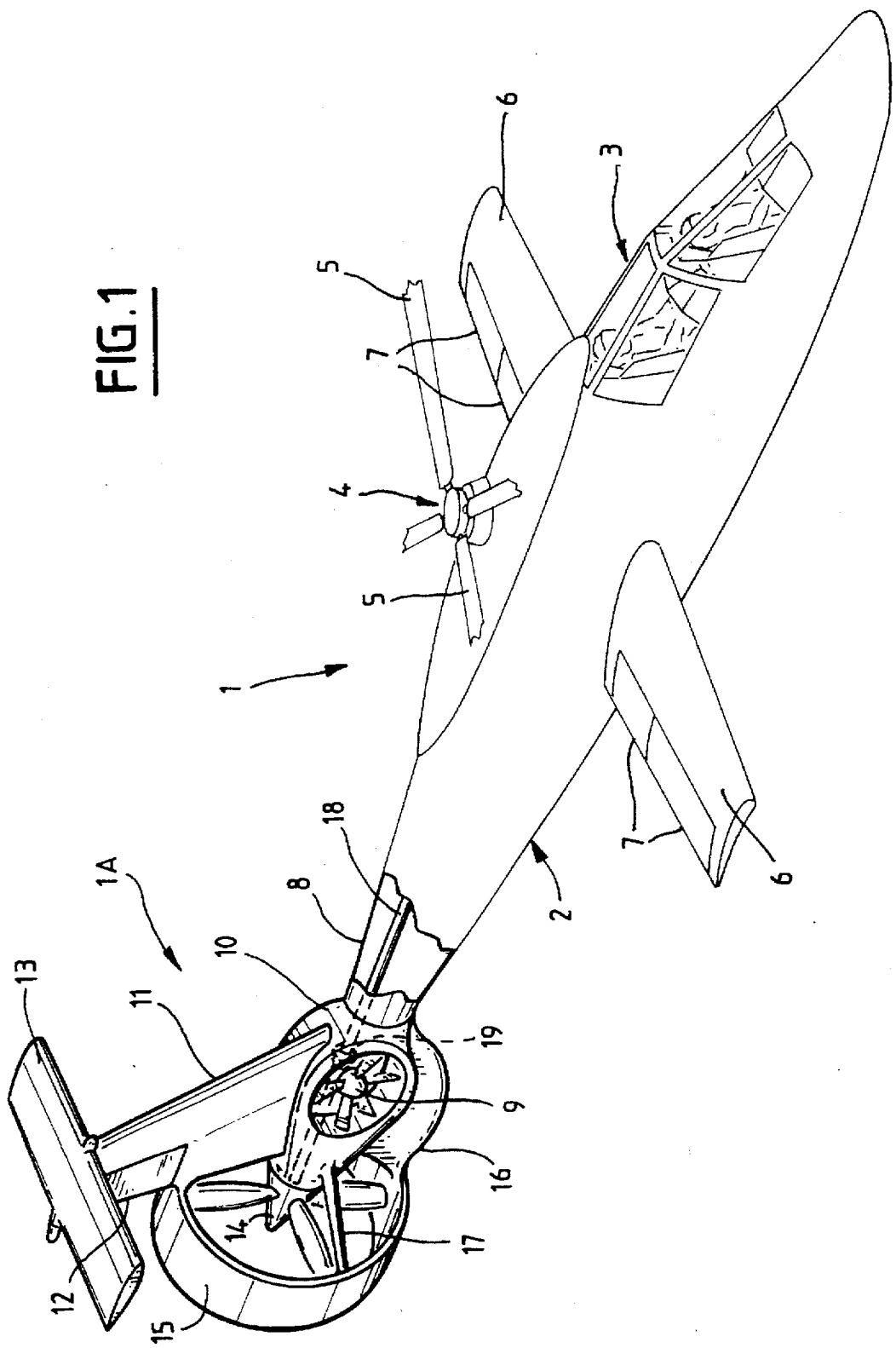
FIG. 1 is a diagrammatic view in perspective of an example embodiment of a compound helicopter according to the invention.
Figure 2:
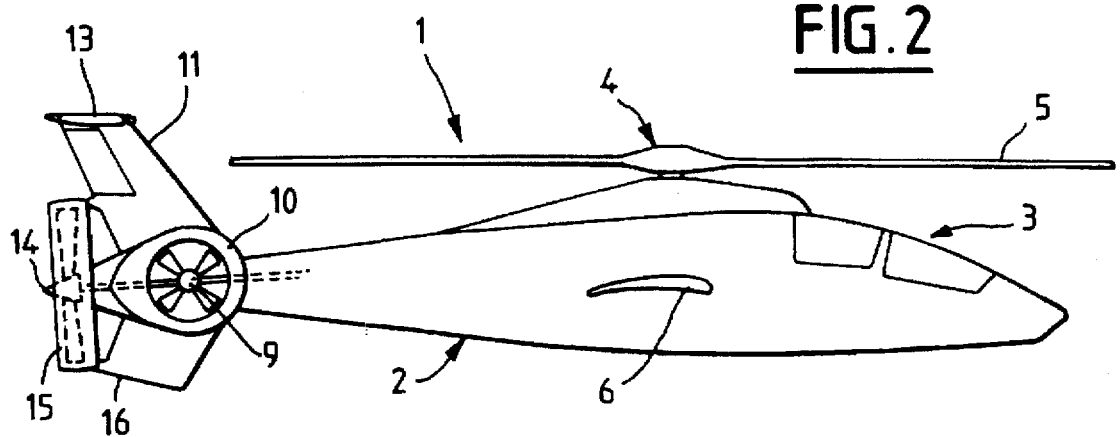
FIG. 2 is a side view of the helicopter of FIG. 1.
Figure 3:
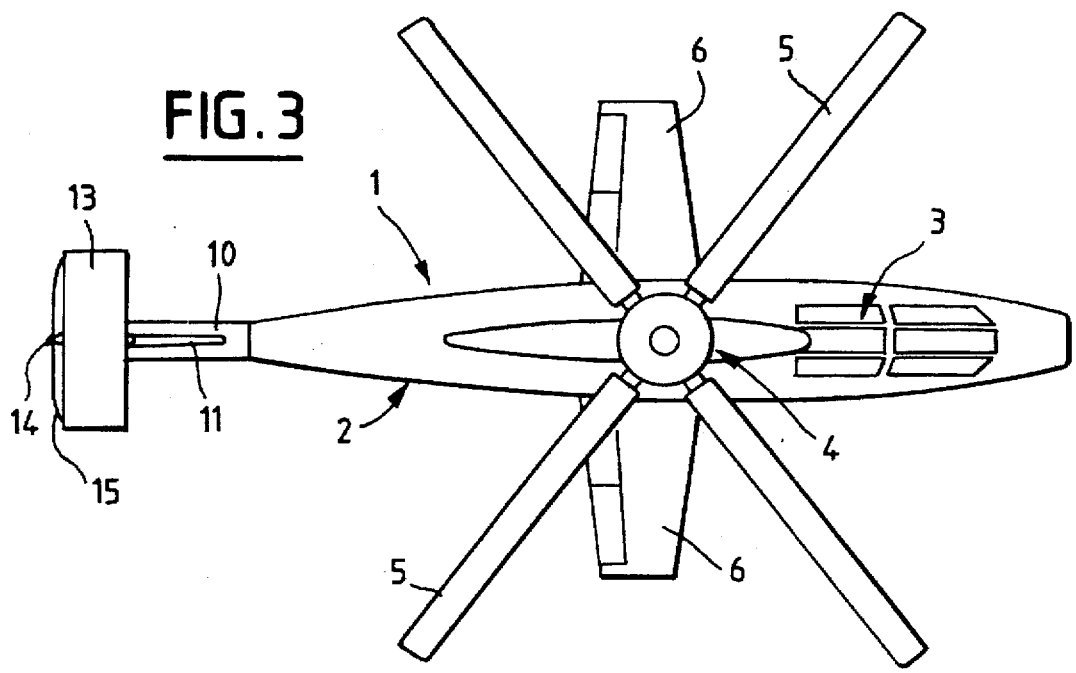
FIG. 3 is a top view of the helicopter of FIG. 1.
Figure 4:
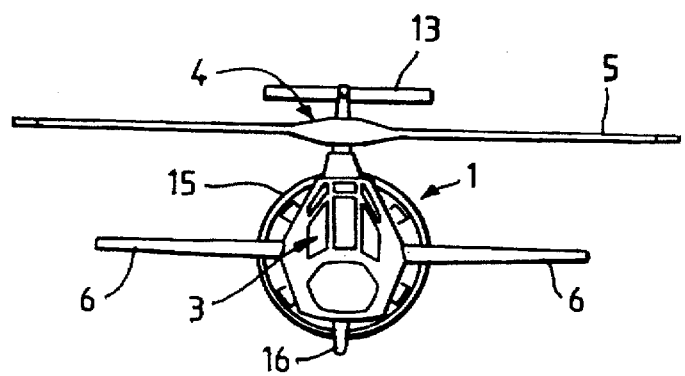
FIG. 4 is a front view of the helicopter of FIG. 1.

An example of a compound helicopter 1, produced in accordance with the invention, has been represented in FIG. 1.

As is normal, the compound helicopter 1 comprises a fuselage 2, at the front of which is provided the cockpit 3, a main rotor 4 intended to drive blades 5 in rotation, which are sketched in FIG. 1, by virtue of an engine and a main gearbox which are not represented, and wing elements 6, 6 arranged on either side of the fuselage 2 and equipped with flaps 7, at least lift-dumping flaps in order to allow the aircraft to be set correctly into autorotation. Moreover, the wing elements are necessary to provide lift at high speeds, beyond 300 to 350 km/h, given the loss of performance of the main rotor at these speeds, while preserving a considerable manoeuvring margin at high speed.

Moreover, there is provision, in the vicinity of the end of the tail boom 8, for an anti-torque rear rotor 9, which is housed, in this example, in a shroud 10 additionally supporting a vertical empennage 11, fitted with a rudder flap 12 and linked, at its free upper end, to a horizontal empennage 13. The rudder flap 12 makes it possible to control the apparatus at high speed.

At the end of the tail boom 8, that is to say in fact at the end of the shroud 10, an auxiliary thruster propeller 14 is arranged, set within a shroud 15, in the form of a cylindrical portion of dimensions matching the diameter and the longitudinal "size" of the propeller 14, peripherally surrounding the latter and leaving its front and rear faces free. It will be noted that the configuration of the vertical 11 and horizontal 13 empennages takes account of the presence of the auxiliary thruster propeller 14. In order to limit the interactions between the horizontal empennage and the propeller, as well as to limit interaction with the blast from the rotor at low speed, the horizontal empennage 13 is placed in a high position. As represented, the shroud 15 of the propeller 14 is linked, in a structural assembly 1A, on the one hand, to the shroud 10 of the rotor 9 by a lower vertical plane 16 as well as by support arms 17 (only one being visible in FIG. 1) and, on the other hand, to the vertical empennage 11. Advantageously, the assembly 1A formed from the shroud 15, the vertical empennage 11 and the shroud 10 may constitute a single piece. For reasons of clarity in the drawing, the structural assembly 1A is represented in heavy lines in FIG. 1.

The thruster propeller 14 is driven by a driveshaft 18 linked to the main gearbox. The shaft 18 may be common to the thruster propeller 14 and to the anti-torque rotor 9 to which it is then linked by a suitable transmission particularly including the conical pinion 19. In this case, the anti-torque rotor 9 must be able to be disengaged from the driveshaft 18 at high speed.

We claim:

1. A rotary-wing aircraft, especially such as a helicopter, of the compound type including:

a fuselage (2), fixed-wing elements (6) arranged on either side of said fuselage (2), at least one main rotor (4), an anti-torque rear rotor (9) having a shroud (10), and a rear thruster propeller (14), arranged at the end of the tail boom (8) of said fuselage (2) and having a shroud (15), wherein said shroud (10) of said anti-torque rotor (9) and said shroud (15) of said thruster propeller (14) are linked by a vertical empennage (11) to form a structural assembly.

2. The rotary-wing aircraft as claimed in claim 1, wherein said vertical empennage (11) is equipped with a rudder flap (12).

3. The rotary-wing aircraft as claimed in claim 1, wherein the shroud (10) of the anti-torque rotor (9) and the shroud (15) of the thruster propeller (14) are linked by support arms (17).

4. The rotary-wing aircraft as claimed in claim 1, which comprises a horizontal empennage (13) at the free upper end of the vertical empennage (11).

5. The rotary-wing aircraft as claimed in claim 1, wherein the shroud (10) of the anti-torque rotor (9), the vertical empennage (11) and the shroud (15) of the thruster propeller (14) constitute a structural assembly in one piece.

6. The rotary-wing aircraft as claimed in claim 1, wherein the shroud (10) of the anti-torque rotor (9) and the shroud (15) of the thruster propeller (14) are linked by a lower vertical plane (16).

7. The rotary-wing aircraft as claimed in claim 1, wherein, for the anti-torque rotor (9) and the thruster propeller (14) a common driveshaft (18). is provided, linked to the main gearbox and from which the anti-torque rotor (9) can be decoupled.

8. A rear structural assembly for a rotary-wing aircraft, especially such as a helicopter, of the compound type including:

a fuselage (2), fixed-wing elements (6) arranged on either side of said fuselage (2), at least one main rotor (4), an anti-torque rear rotor (9) having a shroud (10), and a rear thruster propeller (14), arranged at the end of the tail boom (8) of said fuselage (2) and having a shroud (15), wherein said structural assembly (1A) consists of the assembly formed by said shroud (10) of said anti-torque rotor (9), by said shroud (15) of said thruster propeller (14) and by a vertical empennage (11) linking both shrouds (10 and 15).

9. The structural assembly as claimed in claim 8, wherein said vertical empennage (11) is fitted with a rudder flap (12).

10. The structural assembly as claimed in claim 8, which comprises a horizontal empennage (13) at the free upper end of the vertical empennage (11).

11. The structural assembly as claimed in claim 8, wherein the shroud (10) of the anti-torque rotor (9), the vertical empennage (11) and the shroud (15) of the thruster propeller (14) constitute a structural assembly in one piece.

12. The structural assembly as claimed in claim 8, wherein the shroud (10) of the anti-torque rotor (9) and the shroud (15) of the thruster-propeller (14) are linked by support arms (17).

13. The structural assembly as claimed in claim 8, wherein the shroud (10) of the anti-torque rotor (9) and the shroud (15) of the thruster-propeller (14) are linked by a lower vertical plane (16).

* * * * *